United States Patent
Enjalbert

(10) Patent No.: US 8,509,857 B2
(45) Date of Patent: Aug. 13, 2013

(54) HEADSETS

(75) Inventor: Jerome Enjalbert, Fonsorbes (FR)

(73) Assignee: Freescale Semiconductor, Inc., Austin, TX (US)

( * ) Notice: Subject to any disclaimer, the term of this patent is extended or adjusted under 35 U.S.C. 154(b) by 578 days.

(21) Appl. No.: 12/444,069

(22) PCT Filed: Oct. 6, 2006

(86) PCT No.: PCT/IB2006/054679
§ 371 (c)(1),
(2), (4) Date: Apr. 2, 2009

(87) PCT Pub. No.: WO2008/041064
PCT Pub. Date: Apr. 10, 2008

(65) Prior Publication Data
US 2010/0029344 A1    Feb. 4, 2010

(51) Int. Cl.
*H04M 1/00*    (2006.01)

(52) U.S. Cl.
USPC .......................... 455/569.1; 381/74; 381/122

(58) Field of Classification Search
USPC ........ 455/569.1, 212, 218, 222, 223; 381/74, 381/122; 307/125; 379/430, 388; 439/668; 38/120; 330/253
See application file for complete search history.

(56) References Cited

U.S. PATENT DOCUMENTS

| | | | | |
|---|---|---|---|---|
| 3,573,375 A | * | 4/1971 | Kinzer | 379/171 |
| 5,794,163 A | * | 8/1998 | Paterson et al. | 455/575.2 |
| 6,671,503 B1 | * | 12/2003 | Niwamoto | 455/212 |
| 6,856,046 B1 | * | 2/2005 | Scarlett et al. | 307/125 |
| 2002/0044665 A1 | | 4/2002 | Mantegna et al. | |
| 2003/0144040 A1 | | 7/2003 | Liu et al. | |
| 2003/0188221 A1 | | 10/2003 | Rasmussen et al. | |
| 2004/0008074 A1 | * | 1/2004 | Takehara et al. | 327/524 |
| 2004/0179706 A1 | * | 9/2004 | van Oerle | 381/312 |
| 2005/0085265 A1 | * | 4/2005 | Laroia et al. | 455/560 |
| 2005/0240782 A1 | * | 10/2005 | Hubert | 713/300 |

FOREIGN PATENT DOCUMENTS

| | | |
|---|---|---|
| EP | 1315361 A | 5/2003 |
| EP | 1467285 A | 10/2004 |
| EP | 1542438 A | 6/2005 |
| WO | 0042797 A | 7/2000 |
| WO | 2004001552 A | 12/2003 |
| WO | 2006045617 A | 5/2006 |

* cited by examiner

*Primary Examiner* — Charles Appiah
*Assistant Examiner* — Alexander Yi

(57) ABSTRACT

A detector for detecting the connection of an accessory including a microphone and/or the state of a switch associated with the microphone for a mobile device, wherein the detector comprises a first flag generator for time multiplexing the detection of a signal above a predetermined threshold for each of two comparators, such that for one time period one comparator output is detected and for a second time period the second comparator output is detected to thereby form a first flag; a second flag generator for determining the connection of microphone to thereby generate a second flag; a lookup table for determining the connection of the accessory and/or the state of the microphone switch from the first and second flags.

20 Claims, 9 Drawing Sheets

| MicBias is disabled – Detection is enabled | No Headset | Headset Without Mic | Headset With Mic | Headset With Mic Serial SW closed | Headset With Mic Serial SW open | Headset With Mic Parallel SW open | Headset With Mic Parallel SW closed |
|---|---|---|---|---|---|---|---|
| MCB > Vth_Hi during T1 ? | yes | yes | no | no | yes | no | no |
| MCB > Vth_Lo during T2 ? | yes | yes | yes | yes | yes | yes | no |
| MCBS bit | 0 | 0 | 1 | 1 | 0 | 1 | 0 |

Fig. 5

HEADSETS

FIELD OF THE INVENTION

The present invention is concerned with improvements in or relating to headsets for example, for mobile equipment such as phones, pdas, players and the like.

BACKGROUND OF THE INVENTION

Many different types of equipment may have a headset connected thereto. The equipment includes mobile phones, pdas, mp3 players etc. The headset connection is generally made by way of a jack which plugs into the equipment or may be by an equivalent wireless connectivity.

In the case where the headset is also equipped with a microphone, the headset includes a send/end button which allows the user to start and finish a voice transmission for example for a phone call. The button press is detectable in the device, using a serial button circuit as shown in FIG. 1. The button 100 located in the headphone is serially connected and is normally closed. When the headset is inserted or removed or the button is pressed the circuit in for example FIGS. 2a and 2b detected these events.

For FIG. 2a when the headset is inserted the MCB voltage is driven to zero by the low impedance of the microphone and the flag rises to 1. With reference to FIG. 2b, when the send/end button is pressed the current flow through the switch is cut and the MCB voltage, rises to 2.775V. This causes the flag to drop to 0. The flag events are an indicator of the state of the headset and are used to start and finish a phone call. The detection system for the switch as shown is in essence a low value DC pull-up current source and a voltage comparator having a threshold set midway between ground and an audio supply. This mode of operation is highly efficient and allows a long standby period with minimum power consumption.

A need has now arisen to have a different mode of operation of a headset. That is to have voice activated dialing or control using the headset, for example for switching the phone from standby to active mode or vice-versa. In these situations there are more states than in the prior art mode of operation and thus detection of these is more complex. In addition, the standby power consumption modes must be preserved in order that the different operational modes do not impact battery functionality and that all the different states of the microphone can be identified without unnecessary power consumption. A further consideration which is taken into account is to adopt more cost effective means of switching on the headset, for example to use a parallel rather than serial switch.

An object of the present invention is to overcome at least some of the problems associated with the prior art. Another object of the present invention is to provide a low power detection system for recognising different states of a headset fitted with a parallel and/or series switch.

SUMMARY OF THE INVENTION

The present invention provides a detector device and a method for operating a detector device as defined in the accompanying claims.

The invention has the advantage that a time multiplexing detection of the headset connection and Send/End switch state ensures minimum standby power consumption. The detecting method and circuit ensures compatibility for both serial and/or parallel switches on the headset and allows detection of all the different states of the headset in each mode of operation.

BRIEF DESCRIPTION OF THE DRAWINGS

Reference will now be made by way of example, the accompanying drawings in which:

FIG. 5 is a table describing the voltage levels and states for different cases for the FIG. 3 circuit according to an embodiment of the present invention.

DETAILED DESCRIPTION OF THE PREFERRED EMBODIMENTS

Figure 1:
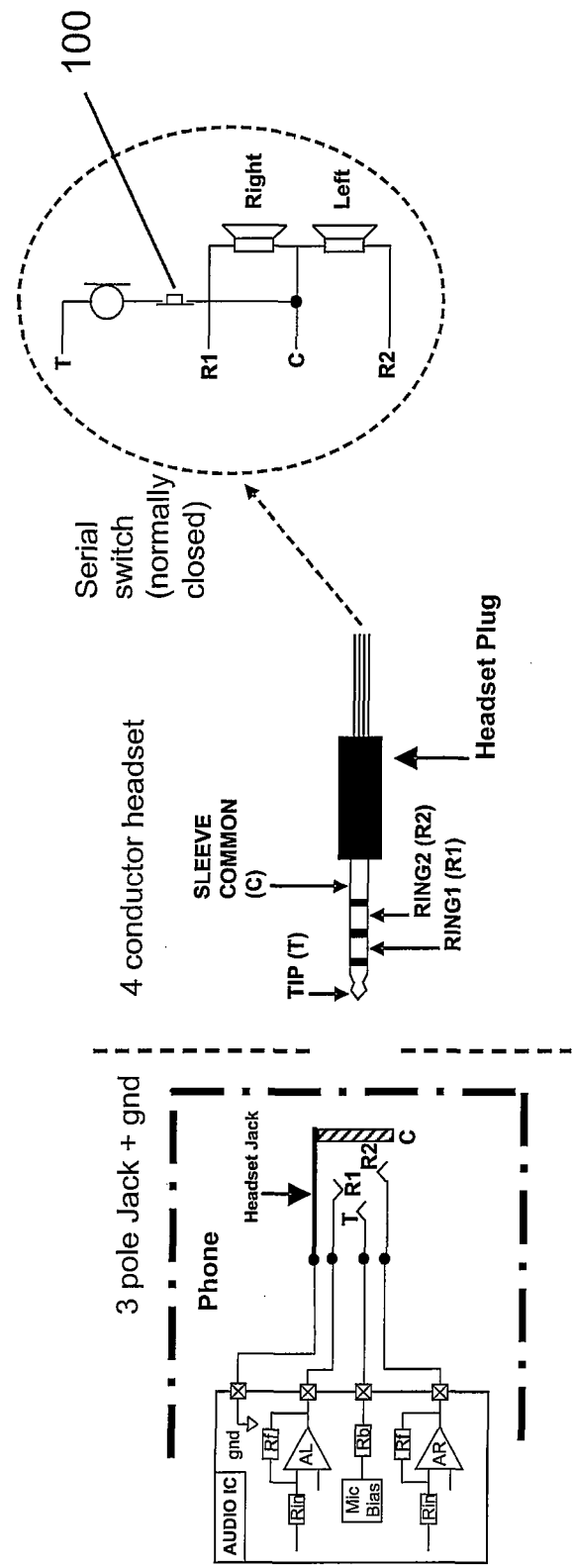
FIG. 1 is a prior art diagram showing a headset and a serial switch.
Figure 2A:
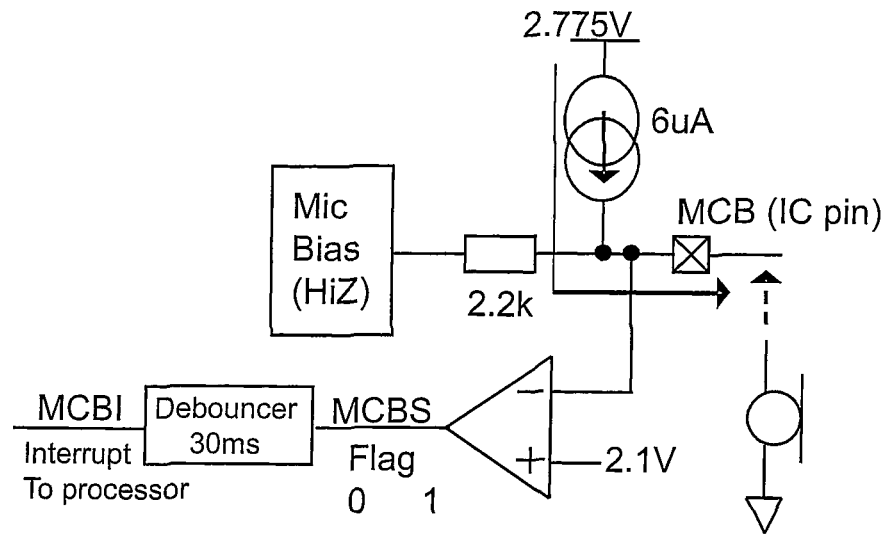
FIG. 2A is a prior art diagram showing the detection of insertion or removal of the headset.
Figure 2B:
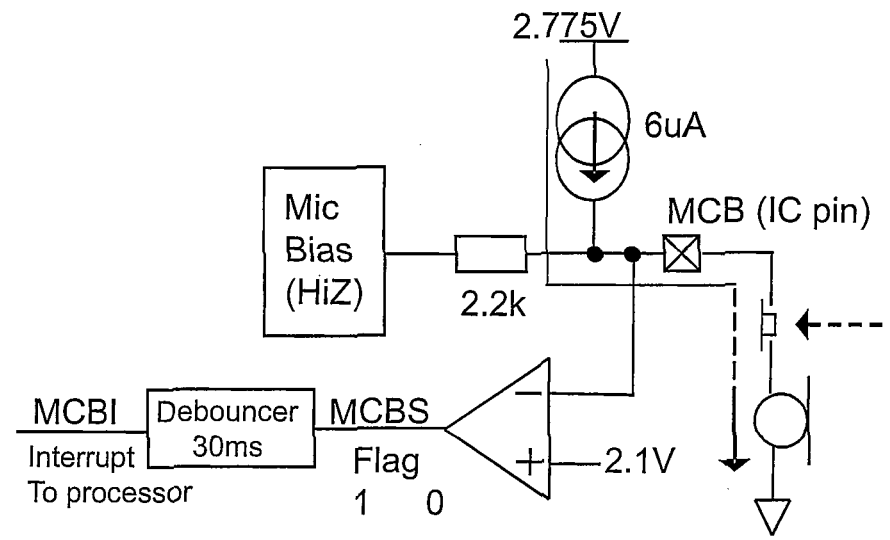
FIG. 2B is a prior art diagram showing the detection of the send/end key activation in the case of a serial switch.
Figure 3:
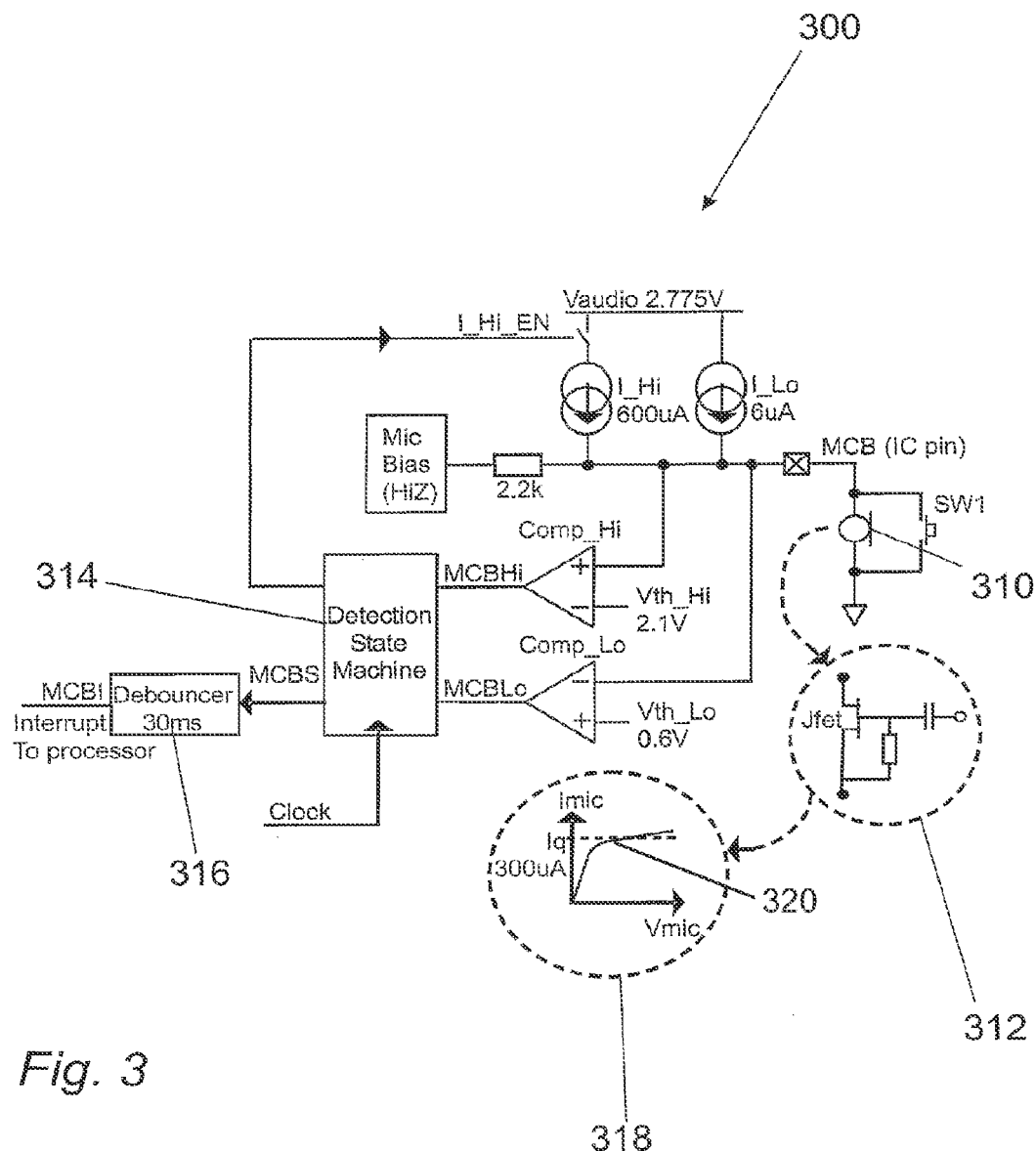
FIG. 3 is a circuit diagram according to one embodiment of the present invention.

FIG. 3 shows a detection system 300 for detecting the state of a headset having either a parallel or serial switch (SW) for activation purposes. The detection system 300 is in the form of an integrated circuit located in the phone. The circuit includes the following main elements which will each be described in greater detail below:
- a voltage regulator (mic Bias);
- two current sources (I_Hi, I_Lo);
- two detection comparators (Comp_Hi, Comp_Lo);
- a microphone (310) which is shown in greater detail in circle 312 (in particular the JFET);
- a parallel switch SW1;
- a detection state machine (314);
- an IC pin (MCB);
- a debouncer (316)
- a voltage source (V audio (2.775V));
- various other components and connections as shown in the diagram.

Graph 318 shows the electrical behavior of the microphone in respect of current Imic versus voltage Vmic. In the first part of the curve 320 the increase in the Imic causes only a small voltage with not much change over the first 300 μA. This makes detection of a current change very difficult. However above Iq of the device the voltage changes substantially with current and difference levels are much easier to detect. This thus means that activation of the parallel switch is much more complicated to detect than activation of a serial switch. This is due to the fact that with only a low value pull up current source (as in the prior art) it is very difficult to identify the difference between insertion of the headset jack into the phone and closing the parallel switch. This is because both draw the IC pin voltage (MCB) close to zero and the difference between the two values cannot be detected. Accordingly an embodiment of the present invention is shown in FIG. 3 which uses an additional high value current source and makes use of the non-linearity of the JFET of the microphone. This will now be described in more detail.

It is assumed that insertion and/or deletion of the headset is not accompanied by a send/end button press. The high value current source is used to distinguish a connection of the microphone (or headset) from a closed parallel switch. This high value current source is enabled periodically by the state machine 314 and outputs the detection flag MCBS. Microphones are built in such a way that they contain a JFET or other semiconductor device, which controls their output current. I_Hi is set to be higher than the quiescent current Iq drawn by the JFET (100 µA to 500 µA) so that the MCB voltage rises close to Vaudio when switch SW1 is open. This in turn causes MCB_Hi (the output form the comparator Comp_Hi) to go high. By comparison when the switch SW1 is closed, I_Hi flows through the relatively low resistance path of the switch, which causes the MCB voltage to go low (eg ~6 mV.). This in turn causes the MCB_Lo (the output from the comparator Comp_Lo) to go high. The outputs MCB_Hi and MCB_Lo are detected by the detection state machine 314 and output flag MCBS is generated.

Using the high current source is a drain on power which can have a negative impact on standby power consumption and periods. However it is necessary to use the high current source for some of the detection of states. Accordingly the embodiment of the invention proposes the use of time multiplexing in the detection of the microphone (headset) connection and/or serial switch state and for the detection of the parallel switch state.

Figure 4:
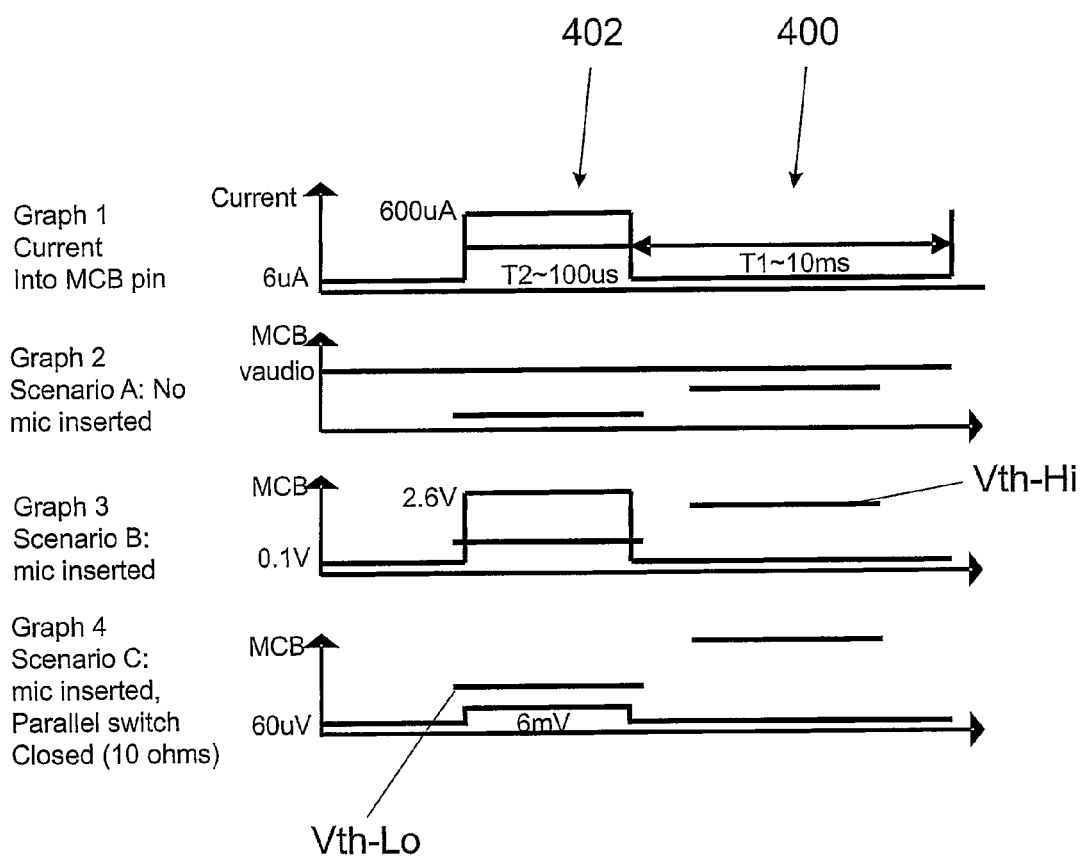
FIG. 4 is a graph showing the electrical behaviour of a headset microphone according to an embodiment of the present invention.

The manner in which this works is shown with reference to timing diagrams of FIG. 4.

FIG. 4 shows the graph of current injected into the MCB pin versus time. It also shows the graph of MCB voltage versus time for three different situations. There are two time periods shown T1 and T2. T1 is of the order of 10 ms and during this time on the low current source (I_Lo) is on (400). T2 is a much shorter time period of the order of 100 µs and during this time the high current source is switched on (402). The current into the IC pin (MCB) is thus as shown in the first timing graph 1. The next three graphs 2-4 show three different scenarios A, B and C.

In scenario A there is no microphone (or headset) connected, or there is a microphone connected but the serial switch is opened. During time period T1 if there is no headset MCB is pulled up to the audio supply VAUDIO by the low current source (I_Lo). The threshold of comp_Hi is 2.1V and in this state the output MCBHi is 1. Similarly during time T2 the MCB voltage is pulled up to VAUDIO by the high current source (I_Hi). As the threshold voltage of comp_Lo is 0.6V, the output of MCBLo is 0.

In scenario B (in graph 3) the headset or the microphone is inserted and the parallel switch is open. During time T1 the MCB voltage is low and below the threshold voltage of comp_Hi and thus the output of MCBHi is low (O). However during time T2 the MCB voltage is high and above the threshold of comp_Lo. Thus the output of MCBLo is low (0).

Finally in scenario C (in graph 4) the headset or microphone is inserted and the parallel switch is closed (to activate the send/end command). During both T1 and T2 the MCB voltage is very low due to the fact that a low resistance flow of current is facilitated through the switch. Thus MCB voltage is below the thresholds of both Comp_Hi and Comp_Lo giving rise to output MCBHi being low (0) during time T1 and output MCBLo being high (1) during time T2.

By taking into account the state (low or high) of MCBHi and MCBlo in each cycle the status of the headphones or microphone (and the send/end switch) can be determined. The cycle is the time between each time (T2) I_Hi is on. In order to minimize current consumption T2 is on only a small fraction of the cycle time. For example:

$$T2/(T1+T2)=1/100.$$

Thus the average system consumption remains low, as given by:

$$\langle Iq \rangle = \left( \frac{T2}{T1+T2} \cdot IHi \right) + \left( \frac{T1}{T1+T2} \cdot ILo \right)$$

In the current example as shown in the circuit of FIG. 3 this equates to $$6 \; \mu A + 6 \; \mu A = 12 \; \mu A$$

The FIG. 3 circuit according to an embodiment of the present invention can also be used to detect the microphone and serial switch activation. This means that the same circuit can be used for headphone/microphone with either a serial or parallel switch. The details of how each state is detected are shown. For each state a determination is made during T1 and T2 to determine if MCB is above the respective thresholds (Vth_Hi and Vth_Lo). From the answers the MCBS bit is determined. The table in FIG. 5 shows:

no headset;
headset without microphone;
head set with microphone;
head set with microphone serial switch closed;
head set with microphone serial switch open,
head set with microphone parallel switch open
head set with microphone parallel switch closed.

This gives the MCBS bit. A software code can discriminate between headset insertion and removal and send/end button press due to a second flag which is a headset detect sense bit. This can be provided either by mechanical means (additional contact in the phone jack barrel which makes or breaks an electrical connection when the jack plug is inserted) or electrical means for instance speaker impedance detection. If the headset is still present when a MCBS state change is detected, this means the Send/End Key was pressed or released. If the headset detect sense bit and MCBS bit have both changed state, then this means the headset has been inserted or removed. Thus from the first flag (MCBS bit) as shown in the table the state of the activated send/end switch can be determined (ie serial open; parallel closed). This distinction between this and the presence or not of a microphone (no headset; headset without microphone) is determined form the headset detect sense bit. If MCBS bit is zero and headset detect sense bit is zero there is no microphone. Whilst if MCBS bit is zero and headset detect sense bit is one there has been a button press on the switch. Details of the headset detection sense bit will be described in greater detail below.

Figure 6A:
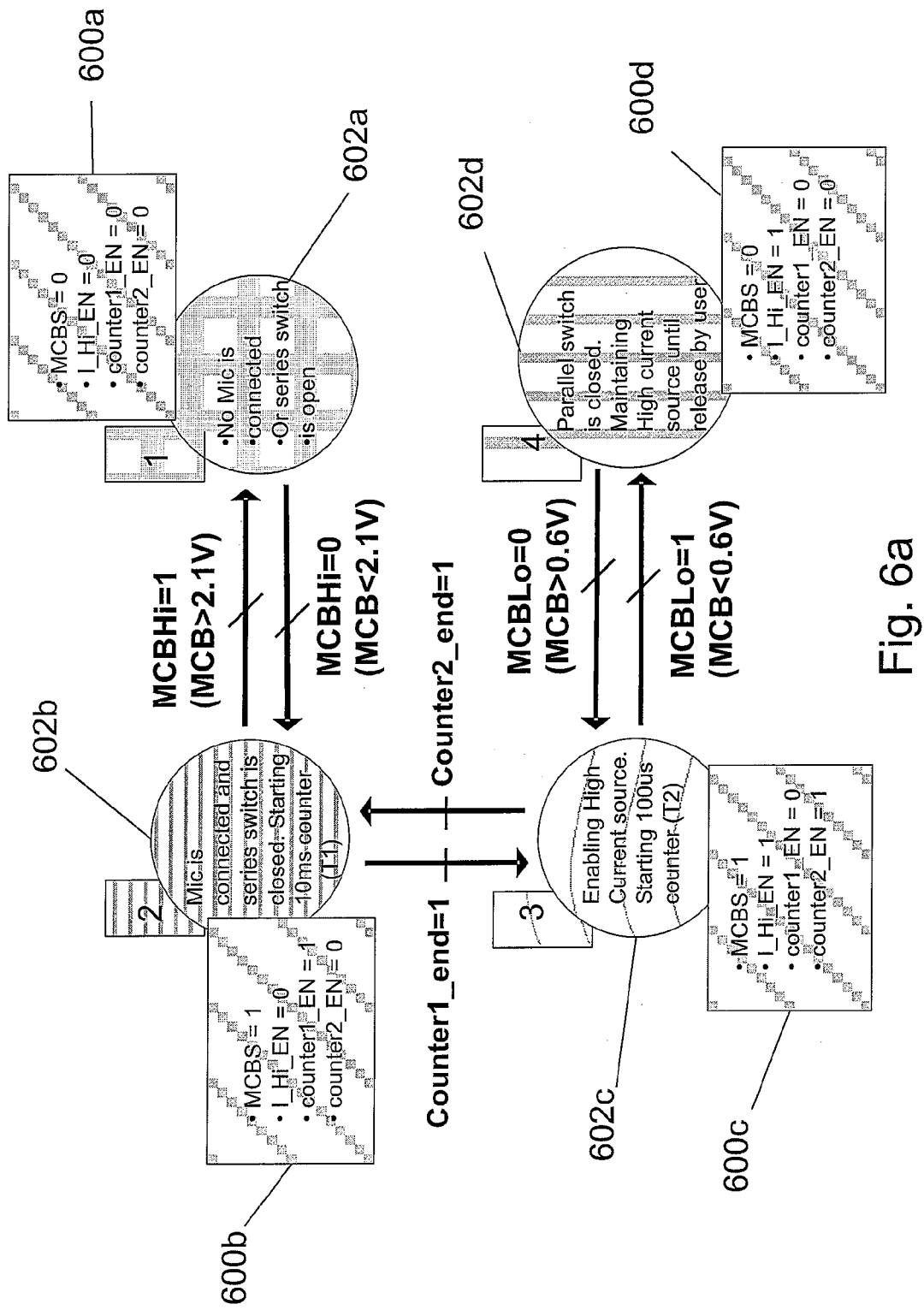
FIG. 6a is a simplified state machine diagram according to an embodiment of the present invention.
Figure 6B:
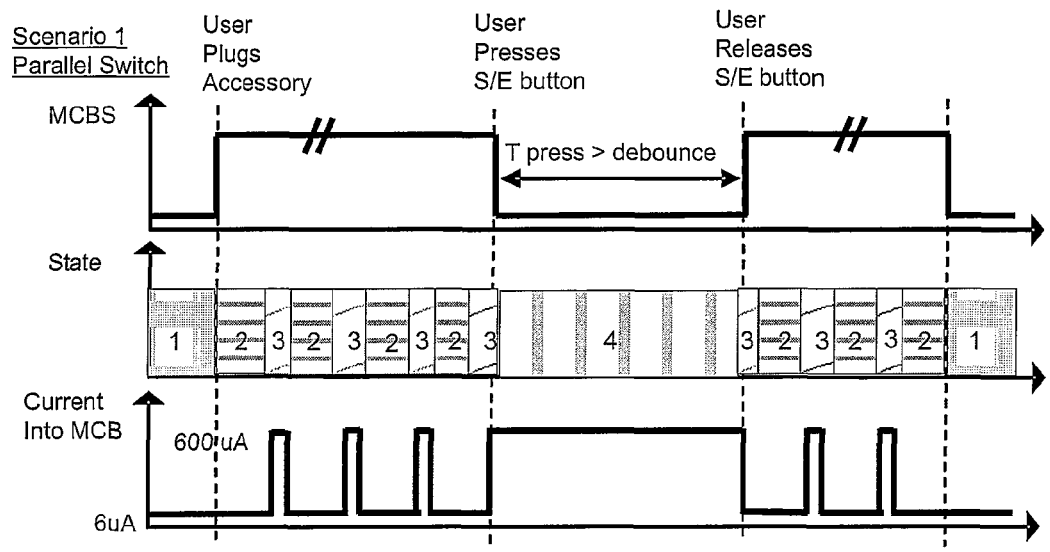
FIG. 6b is the graph associated with the state machine of FIG. 6a according to an embodiment of the present invention.
Figure 6B:
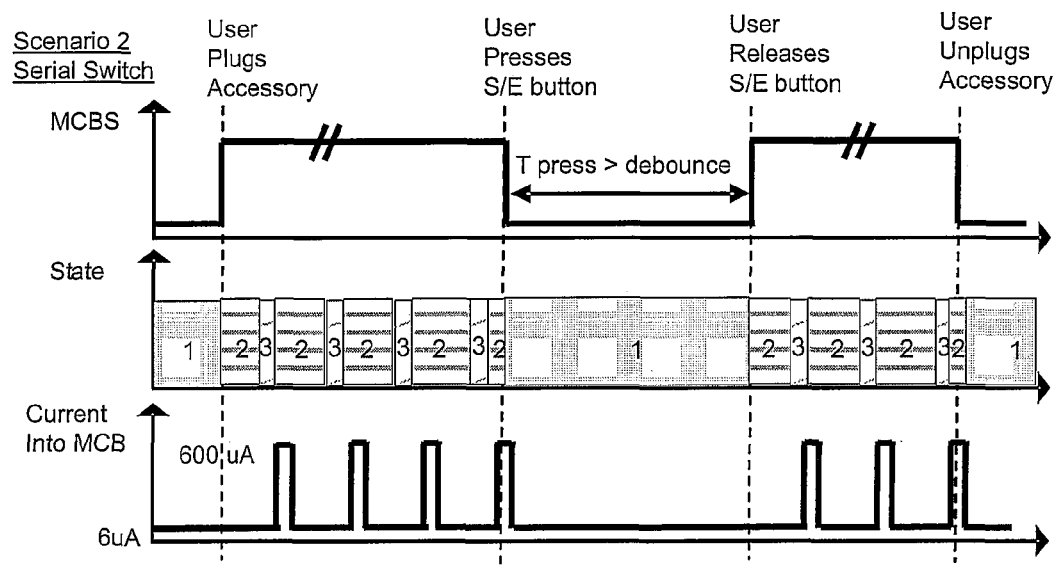

Referring now to FIG. 6a an example of simplified state machine diagram is shown. The inputs are:

MCBHi (Vth_Hi~2.1V);
MCBlo (Vth_Lo~0.6V);
Counter 1_end (T1~10 ms);
Counter 2_end (T2~100µ).
All are shown in bold on the arrows in FIG. 6a.
The outputs are:
MCBS;
I_Hi_EN
Counter 1_EN Counter 2_EN All are shown in boxes 600(a), (b), (c) and (d), where (a) is state 1, (b) is state 2, (c) is state 3 and (d) is state 4. The details of each state are shown in circles 1 to 4 (602a-602d respectively). The hashing or pattern in each circle is indicative of the corresponding that in the graphs shown in FIG. 6b, and is used to determine the first flag (MCBS bit) in the state determination process for both parallel and serial switches. The graphs also show the effect of the debouncer 316 in FIG. 3. The debouncer is used to handle glitches on the ICpin (MCB) or if the state machine gives an error or a short circuit occurs.

Figure 7:
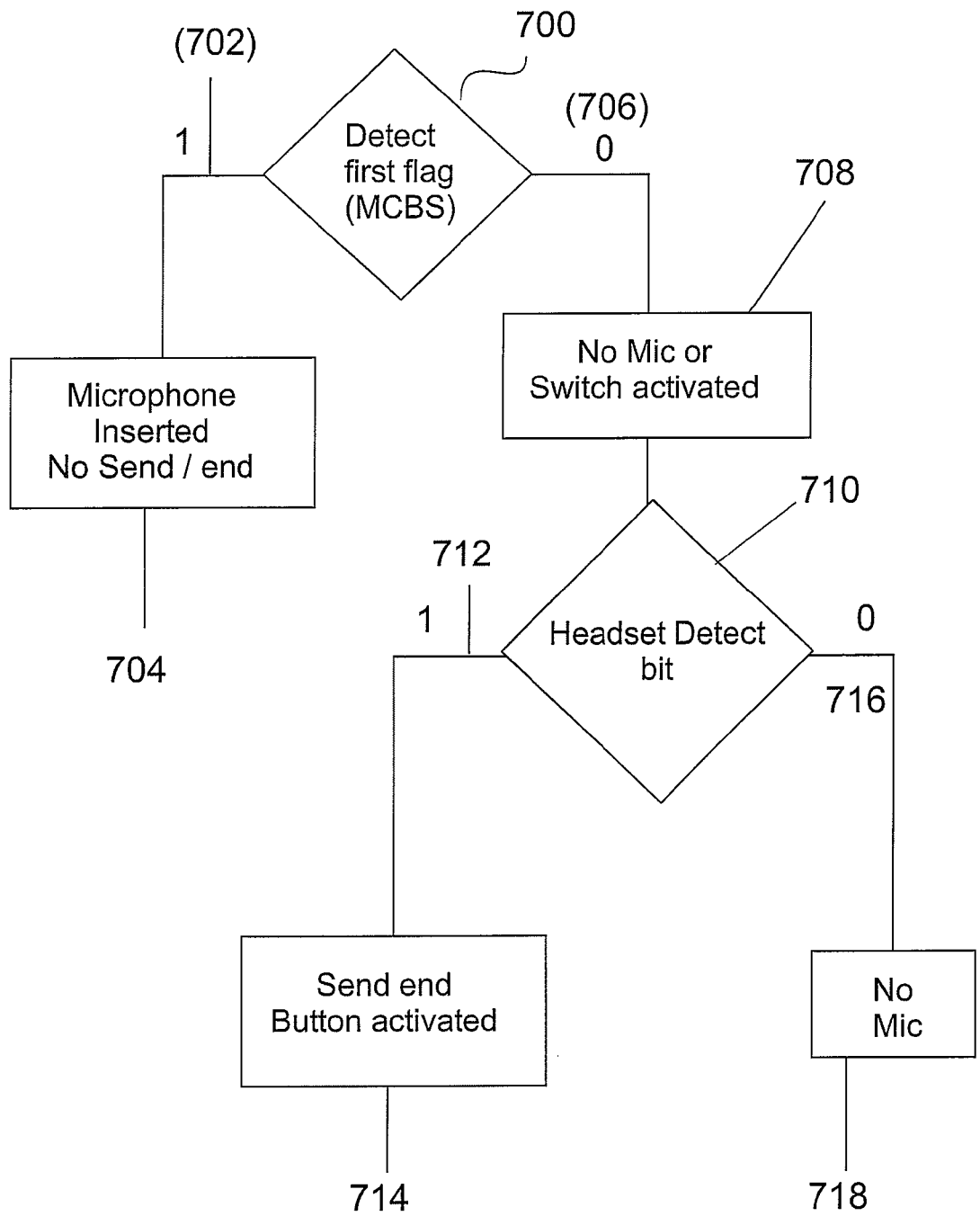
FIG. 7 is a flow chart showing the method steps according to an embodiment of the present invention.

The basic method steps as carried out to detect the microphone and switch activation are shown in the flow chart of FIG. 7. The first flag (MCBS) is detected (700). If the flag is 1 (702) the microphone is inserted and no send/end button press has occurred (704). If the flag is 0 (706) there is either no microphone or the switch has been activated (708). At this point the headset detect sense bit is detected (710). If this is 1 (712) the send/end button has been activated 714. If this second flag is 0 (716) there is no headset hence no microphone connected (718).

Figure 8:
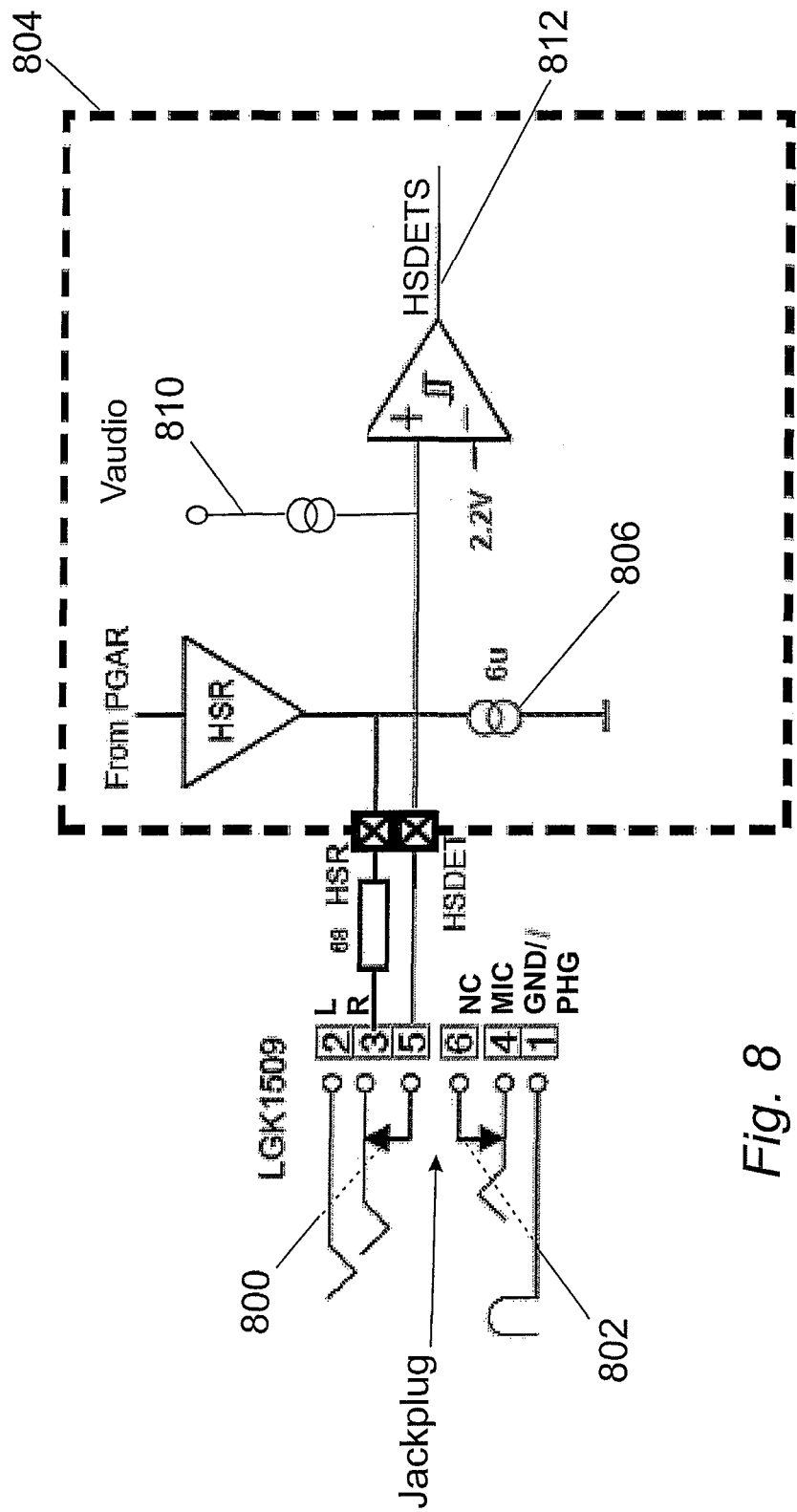
FIG. 8 is a circuit for detecting the connection of a headset/accessory according to an embodiment of the present invention.

As previously indicated the head set detection sense (HS-DET) may be determined using a jack barrel with additional pins which are connected to a dedicated detection circuit. An example of how this can be carried out is shown with respect to FIG. 8.

Generally the jack plug (not shown) will be pushed into connection in the region of pins 5 and 6 and in so doing will break contact made by the arrows 800 and 802 between pins 3 and 5 and pins 6 and 4. The fact that these contacts are broken is detectable by the circuit 804. The circuit includes an audio amp (HSR) for the right speaker, a first current source 806 connected between the audio amp pin HSR and ground; a comparator 808 having one input connected to detection pin HSDET and the second input connected to a reference voltage; a second current source connected between detection pin HSDET and Supply voltage Vaudio. The audio amp pin is connected on the phone board to pin 3 of the jack barrel. The detection pin HSDET is connected on the phone board to pin 5 of the jack barrel.

When there is no headset connected pins 5 and 3 are connected. The current of the first current source is greater than that of the second and hence the HSDET voltage is pushed to ground. This results in a HSDETS output 812 of zero (0).

When the headset is inserted the connection of 800 and 810 are broken thus the first current source is not connected and VAudio is the voltage on the HSDETS pin 814 is higher than the reference voltage of the comparator. This means the HSDETS output 812 is high (1).

It will be appreciated that the present invention disclosed a specific circuit which is not limited and is shown by way of example only variation of circuit components and lay out will be evident to the person skilled in the art. It will also be appreciated that the invention may apply to different circumstances that that of a telephone (or pda etc) and a headset.

While the invention has been particularly shown and described with reference to a preferred embodiment it will be understood that various changes in form and detail may be made therein without departing from the spirit, and scope of the invention.

The invention claimed is:

1. A headset detector comprises: A first flag generator configured to detect a connection of an accessory and to generate a first flag in response to the connection of the accessory, the accessory including a microphone and a switch connected to the microphone; a second flag generator including a low current source and a high current source, wherein the low current source is enabled during both a first time period and a second time period, the second flag generator configured to periodically detect a signal above a predetermined threshold for each of a first comparator and a second comparator, to enable the high current source only during the second time period, to set, in response to the first flag being generated during the first time period, a state of a second flag based on an output state of the first comparator, wherein the output of the first comparator is based on a current from the low current source during the first time period, and to set, in response to the first flag being generated during the second time period, the state of the second flag based on an output state of the second comparator, wherein the output of the second comparator is based on a current from the high current source during the second time period.

2. The detector of claim 1, wherein the second flag generator includes:
    a microphone device which has a variable current response;
    wherein the first comparator is a high comparator having a first threshold, the second comparator is a low comparator having a second threshold, the current sources are switched on in a periodical manner and wherein the high current source is switched on for a fraction of the time of the low current source and wherein a current response of the microphone device is measured by the first comparator and the second comparator to generate the second flag.

3. The detector of claim 2, wherein the switch is connected in parallel to the microphone device.

4. The detector of claim 2, wherein the high comparator measures the current response when the high current source is on and the low comparator measures the current response when the low current source is on.

5. The detector of claim 4, wherein the high current source is on for about $1/100^{th}$ of the time of the low current source is on.

6. The detector of claim 2, further comprising a detection state machine for measuring outputs from both the high comparator and the low comparator to generate the second flag.

7. The detector of claim 2, wherein the detection state machine controls the switching of the high current source and the low current source.

8. The detector of claim 2, wherein the microphone device includes a JFET.

9. The detector of claim 2, wherein determination of the connection of the microphone and/or the state of the switch associated with the microphone from the first and second flags is selected from the following:
    no headsets;
    headset without microphone;
    headset with microphone;
    headset with microphone, connected in serial with a closed switch;
    headset with microphone, connected in serial with an open switch;
    headset with microphone, connected in parallel with a closed switch; and
    headset with microphone, connected in parallel with an open switch.

10. A mobile device including the detector of claim 1.

11. The mobile device of claim 10, in the form of a mobile telephone.

12. A headset including a microphone for use with the mobile device according to claim 10.

13. A headset according to claim 12 including a parallel switch.

14. A method of headset detection comprising the steps of: generating a current from a low current source during both a first time period and a second time period; generating a current from a high current source only during the second time period; determining a connection of an accessory including a microphone and a switch connected to the microphone; generating a first flag in response to the connection; determining a second flag by periodically detecting a signal above a predetermined threshold for each of a first comparator and a second comparator; setting, in response to the first flag being generated during the first time period, a state of the second flag based on an output state of the first comparator, wherein the output of the first comparator is based on a current from the low current source during the first time period; setting, in response to the first flag being generated during the second time period, the state of the second flag based on an output state of the second comparator, wherein the output of the second comparator is based on a current from the high current source during the second time period; and determining, by a lookup table, during the first and second time periods, at least one of a group consisting of the connection of the microphone and a state of the switch associated with the microphone from the states of the first and second flags.

15. The method of claim 14, further comprising the step of connecting the switch in parallel with the microphone device.

16. The method of claim 14, further comprising controlling the switching of the current source and the second current source in a periodical time varying manner.

17. The method of claim 16, further comprising switching on the first comparator for about $1/100^{th}$ of the time of the second comparator.

18. A non-transitory computer program comprising instructions for carrying out operations of headset detection, the operations comprising: generating a current from a low current source during both a first time period and a second time period; generating a current from a high current source only during the second time period; determining a connection of an accessory including a microphone and a switch connected to the microphone; generating a first flag in response to the connection; determining a second flag by periodically detecting a signal above a predetermined threshold for each of a first comparator and a second comparator; setting, in response to the first flag being generated during the first time period, a state of the second flag based on an output state of the first comparator, wherein the output of the first comparator is based on a current from the low current source during the first time period; setting, in response to the first flag being generated during the second time period, the state of the second flag based on an output state of the second comparator, wherein the output of the second comparator is based on a current from the high current source during the second time period; and determining, by a lookup table, during the first and second time periods, the at least one of a group consisting of the connection of the microphone and a state of the switch associated with the microphone from the states of the first and second flags.

19. The detector of claim 3, wherein the high comparator measures the current response when the high current source is on and the low comparator measures the current response when the low current source is on.

20. The method of claim 14, further comprising:
determining that the state of the switch is a closed switch connected in parallel with the microphone; and
continuously generating the current from the high current source as the second time period until the state of the switch is an opened switch or the accessory is removed.

* * * * *

UNITED STATES PATENT AND TRADEMARK OFFICE
CERTIFICATE OF CORRECTION

| | | |
|---|---|---|
| PATENT NO. | : 8,509,857 B2 | Page 1 of 1 |
| APPLICATION NO. | : 12/444069 | |
| DATED | : August 13, 2013 | |
| INVENTOR(S) | : Jerome Enjalbert | |

It is certified that error appears in the above-identified patent and that said Letters Patent is hereby corrected as shown below:

On the Title Page, Item (54) and in the Specification, Column 1, line 1, please correct the title "HEADSETS" to be --IMPROVEMENTS IN OR RELATING TO HEADSETS--

Signed and Sealed this
Twenty-ninth Day of July, 2014

Michelle K. Lee
*Deputy Director of the United States Patent and Trademark Office*